Figure 1:
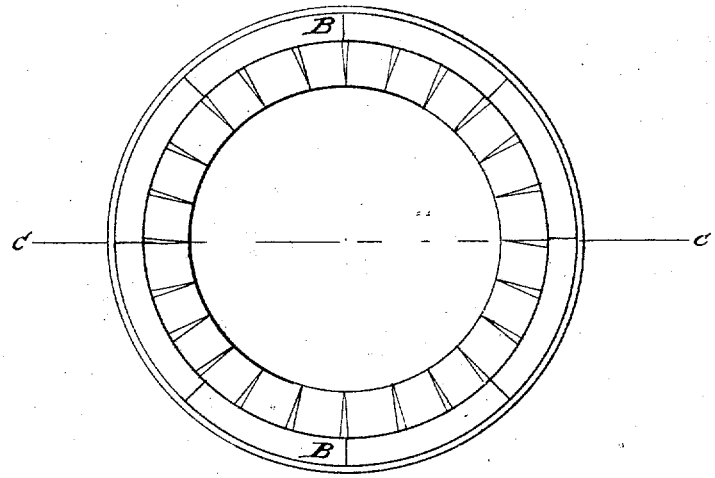
Figure 2:
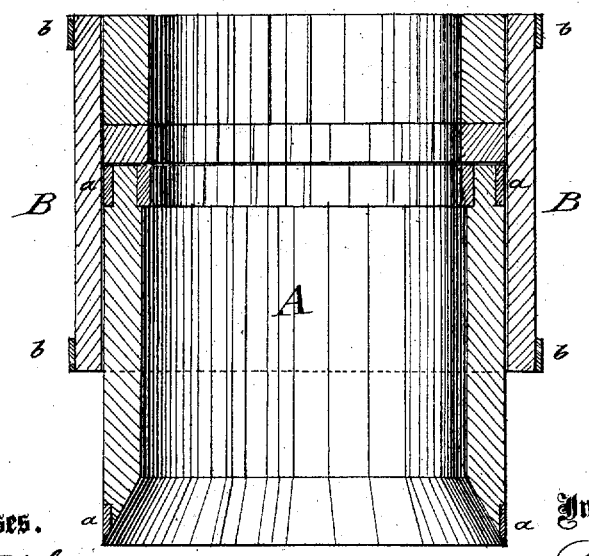

A. CURTIS.

Mode of Constructing Wells.

No. 5,677. Reissued Dec. 9, 1873.

Witnesses.
P. C. Dieterich
A. Sedgwick

Inventor.
A. Curtis
per Munn & Co.
Attorneys.

AM. PHOTO-LITHOGRAPHIC Co. N.Y. (OSBORNE'S PROCESS)

UNITED STATES PATENT OFFICE

ASAHEL CURTIS, OF BASTROP, LOUISIANA.

IMPROVEMENT IN THE MODES OF CONSTRUCTING WELLS.

Specification forming part of Letters Patent No. 139,947, dated June 17, 1873; reissue No. 5,677, dated December 9, 1873; application filed October 18, 1873.

*To all whom it may concern:*

Be it known that I, ASAHEL CURTIS, of Bastrop, in the parish of Morehouse and State of Louisiana, have invented a new and Improved Mode of Constructing Wells, of which the following is a specification:

The invention relates to a new and useful method of constructing wells, which are mainly intended to be dug through quicksand, and adapted for the sandy soil of some of the Southern States, forming thereby the wells quicker and with less brick for curbing than has been heretofore used.

My invention consists of a stationary guide-cylinder or casing, within which the sand is dug out and removed while the bricks are set on a box which slides down by the weight of the wall superposed thereon; forming thus the well as fast as the sand is dug.

In the drawing, A is an ordinary wooden earth-box, sharpened at the lower end to penetrate easier the sand, and provided with bands *a a* at top and bottom. The box A is intended to receive the bricks that are placed thereon, so that box and wall sink gradually lower and lower as the well is built, box A forming the bottom or base on which the wall of the well rests when the same is finished. The cylinder or casing B is bound together by bands *b b*, and of such size that it fits closely around box A. An oval hole is dug of the depth of box B, and then a cylindrical extension of the depth and size of box A. Box A is then placed therein and guide-box B vertically above it, the oval-shaped hole giving room for the mason to stand therein while laying the brick on box A. Box B is then set in a suitable frame, on which the windlass stands, by which the sand is hoisted as soon as dug out. The weight of the wall which is formed continually above box A, together with the removal of the sand, forces box A down till the water-level is reached.

By this method wells may be constructed with great evenness of the wall-bricks, and with perfect perpendicularity. The number and expense of bricks are also economized, especially in country-places to which they are hauled from a long distance.

It has been heretofore tried to set molded arch or well brick on their ends or edges, so as to give the requisite facing with a less number of bricks, but it has been found impracticable to maintain them securely in the proper position in order to receive the intermediate mortar. I have overcome this difficulty by using the outer case B, which is made to support the brick and guide the bricklayer. The casing B, with frame and windlass, is taken up after completion of the well, and used in the same manner for constructing other wells, allowing thereby their construction more rapidly and cheaply than heretofore.

Having thus described my invention, I do not claim the employment of the box or cylinder A in construction of wells, &c., but I claim as new and desire to secure by Letters Patent—

The casing-tube B applied above the sand-penetrating box A, so as to enable the bricks to be laid evenly, perpendicularly, and more economically thereon, forming thus the well in the manner and for the purpose described.

ASAHEL CURTIS.

Witnesses:

ABRAHAM FRIEDHEIM,

F. C. GRAY.